UNITED STATES PATENT OFFICE.

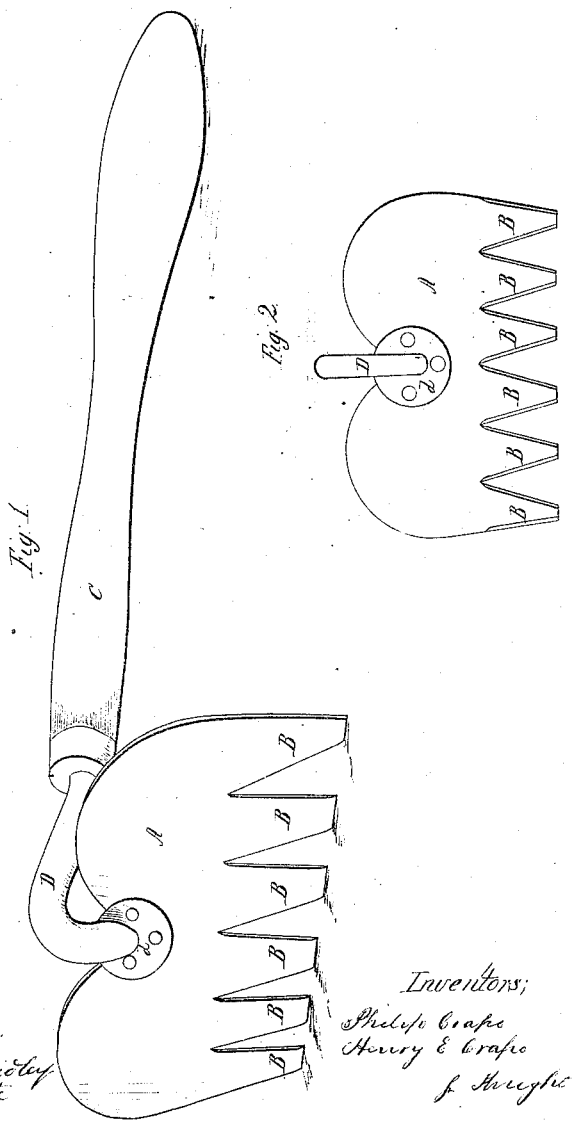

PHILIP CRAPO AND HENRY E. CRAPO, OF BRIDGEWATER, MASSACHUSETTS.

IMPROVEMENT IN HOES.

Specification forming part of Letters Patent No. 32,982, dated August 6, 1861.

*To all whom it may concern:*

Be it known that we, PHILIP CRAPO and HENRY E. CRAPO, both of Bridgewater, in the county of Plymouth and State of Massachusetts, have invented a new and useful Improvement in Hoes; and we do hereby declare the following to be a full, clear, and exact description of the same, reference being had to the accompanying drawings, making part of this specification, in which—

Figure 1 is a perspective view of our hoe, and Fig. 2 a front view of the same.

A represents a common steel hoe-plate, formed with teeth B at its lower edge. The said teeth are formed and applied as represented in the drawings—that is to say, chamfered or beveled at back, and tapering in width toward their lower ends, their whole length being somewhat less than the width of the undivided portion of the hoe-plate.

C is the handle, and D the shank, riveted at *d* to the back of the hoe.

We are aware that toothed hoes have long been in use for working manure and for other purposes, and do not desire to be understood as claiming any tool in which the teeth occupy the chief breadth of the plate, nor any in which the hoe-plate is formed with teeth tapering downward to points.

Our invention is confined to a construction of hoe in which the plate is left entire for at least one-half of its breadth, and in which the teeth meet at their base and taper regularly and gradually downward to narrow edges. By these peculiarities of construction a tool is produced which is adapted to perform the various functions of weeding, earthing-up growing crops, and uncovering potatoes or other roots with greater ease and effect than any other form of hoe or rake of which we have knowledge.

We claim as our invention herein—

A new article of manufacture consisting of a hoe formed with teeth occupying less than one-half its width, beveled at back and tapering gradually downward in width to narrow edges.

In testimony of which invention we hereunto set our hands.

PHILIP CRAPO.
HENRY E. CRAPO.

Witnesses:
SAML. BRECK,
JOSHUA E. CRANE.